2,806,006

PHENOL-FORMALDEHYDE RESIN AND ITS METHOD OF PREPARATION

Kenneth L. Proctor, Collingswood, N. J., and Henry L. Katz, Havertown, Pa.

No Drawing. Application August 1, 1951, Serial No. 239,831

3 Claims. (Cl. 260—2.5)

(Granted under Title 35, U. S. Code (1952), sec. 266)

The invention described herein may be manufactured and used by or for the Government of the United States of America for governmental purposes without the payment of any royalties thereon or therefor.

The present invention relates to a modified cellular phenolic resin and to methods of making such resin. In particular, the invention relates to such resin having high water repellancy and high compression resistance whereby the resin is particularly suited for use as a space filler in marine equipment. The present invention is an improvement on the invention described in Patent No. 2,446,429 of August 3, 1948,, to John D. Nelson and Paul V. Steenstrup for Cellular Phenolic Resin.

Prior to our invention it was known, as described in Patent 2,446,429, that cellular phenolic resin could be prepared in the following manner. To a given major part of resin made from 1 to 1.3 mol ratio of 82% phenol and aqueous solution of formaldehyde (37.2% HCHO) are added small parts of sodium bicarbonate, a wetting agent, and extender such as diatomaceous earth. The mixture is thoroughly mixed and then a sufficient amount of an acid catalyst such as a water soluble sulfonic acid is added and the final mixture rapidly stirred for a short period. The action between the active resin and the acid catalyst is exothermic and when sufficient heat has been generated within the medium, steam and other gases are produced that induce foaming. The whole mass is caused to swell and to expand and to produce a cellular structure that is self-curing. The result is a very porous light-weight foamed plastic whose density varies with the activity of the resin used, but which in general will be found to be within the range of 2 to 5 pounds per cubic foot with the resin described.

The disadvantage of this phenolic resin foam product however is that it absorbs a major quantity of water when immersed in that medium. This adverse feature materially limits the usefulness of the material for marine flotation applications. Exposure of the expanded phenolic foam to a head of water causes losses of buoyancy up to 70%. The product in lower densities exhibits low compression strength.

The present invention overcomes these disadvantages by mixing a small quantity of a selected diisocyanate polyhydric alcohol base resin (resin B hereinafter described) with a phenolic formaldehyde base resin (resin A hereinafter described) to produce a modified cellular phenolic resin having high water repellancy and high compression resistance, whereby the resin is particularly suited for use as a space filler in marine equipment.

An object of the invention is to provide a modified cellular phenolic resin and to provide a method of making such resin.

Another object is to provide a modified cellular phenolic resin by mixing a small quantity of diisocyanate polyhydric alcohol base resin with a phenolic formaldehyde base resin to provide a modified cellular resin having high water repellancy and high compression resistance.

In order that those skilled in the art better may understand how the present invention may be carried into effect, the following examples are given by way of illustration and not by way of limitation.

EXAMPLE I

Preparation of "resin A"

| | Approximate mol ratio |
|---|---|
| "82% phenol"[1] | 1 |
| Aqueous solution of formaldehyde (approx. 37.2% HCHO) | 1.3 |
| Small amount of an alkaline catalyst, specifically barium hydroxide.[2] | |

[1] "82% phenol" is composed of 82 to 84% phenol ($C_6H_5OH$), 3 to 4% o-cresol, and the remainder mainly m- and p-cresols.
[2] The amount of alkaline catalyst may be, for example, between 0.5 and 2% by weight of the phenol. Thus, with barium hydroxide, $Ba(OH)_2 \cdot 8H_2O$, as the catalyst a suitable amount is, for instance, from 1 to 1.5%, more particularly about 1.2% by weight of the phenol.

The above ingredients are heated together under reflux at the boiling temperature of the mass for a period of the order of ¾ to 1 hour. Thereafter the reaction mass is treated to render it non-alkaline, that is, neutral or slightly acid, preferably after cooling to a suitable temperature, e. g., 50 or 60° C. The mass may be brought to a pH of, say, 5 to 7 (but preferably is brought to a pH of 6.5 or less) by the addition of a suitable acid or acid-forming substance, e. g., formic acid, acetic acid, oxalic acid, carbon dioxide, hydrochloric acid, sulfuric acid, phosphoric acid, etc. If the resulting salt of the alkaline catalyst that forms is insoluble or substantially insoluble in the liquid mass it may be separated, if desired, from the liquid partial reaction product, e. g., by filtration. The liquid, non-alkaline mass is partially dehydrated under reduced pressure. Dehydration is continued until the liquid resin has a viscosity of approximately 18,000 to 25,000 centipoises at 25° C., at which point the mass has a specific gravity of about 1.22 to about 1.24 at 25° C., and contains at least about 75%, more particularly about 78 to about 85%, of resin solids as determined by curing a sample to constant weight in a tared container. The aqueous mass of acid-curing, thermosetting, alkaline-catalyzed, more particularly barium hydroxide-catalyzed, liquid product of partial reaction of ingredients including phenol and formaldehyde, prepared as above described, is referred to in this specification as "resin A."

Preparation of "resin B"

| | Parts by wt. |
|---|---|
| Meta tolylene diisocyanante | 10 |
| Pentaerythritol mono-oleate | 5 |
| Pentaerythritol dipropional | 3 |

"Resin B" may be formed by reacting the following ingredients: meta tolylene diisocyanate, pentaerythritol mono-oleate, and pentaerythritol dipropional. These products are reacted in such proportions and under such conditions of temperature and time as to produce a liquid resinous composition having a viscosity equivalent to a Gardner-Holt reading of approximately Z.

In the manufacture of "resin B" there is a very critical range of proportions in which meta tolylene diisocyanate should be combined with pentaerythritol mono-oleate. This problem is further complicated because different lots of both chemicals as purchased on the market vary slightly in reactivity and thereby change to some degree the critical proportions previously established to produce a satisfactory product. In general, the above formula is considered to be approximate.

The specific procedure of preparation entails weighing accurately and mixing with suitable agitation these three ingredients adjusted to individual temperatures of about 20° C. Due to exothermic heat of reaction the temperature becomes excessive unless controlled. The temperature of the mixture should not be permitted to rise above 38–40° C. during the initial reaction period which will be approximately 1 hour.

The mixture is now subjected to the application of external heat, under continuous agitation. Maximum temperature during this period should not exceed 100° C. As a result of continued polymerization reaction the viscosity of the resin being formed should be measured accurately periodically. When the viscosity approaches the equivalent of an X–Z value in the Gardner-Holt scale the reaction is considered completed and the product should be cooled immediately to room temperature. The product then is ready for use.

As indicated in the foregoing, slight alterations in the quantities of ingredients set forth may be necessary in order to produce the proper viscosity and quality of the finished product. For example, if the mixture under heat thickens too readily, the amount of pentaerythritol mono-oleate used should be correspondingly decreased. Conversely, if thickening is too slow the amount of pentaerythritol mono-oleate should be increased. It is evident, therefore, that the formula cannot be more specific than has already been set forth. The resin above described is referred to in this specification as "resin B."

*Preparation of precellular liquid*

|  | Example I | Example II | Example III |
|---|---|---|---|
|  | *Parts* | *Parts* | *Parts* |
| "Resin A" | 100.0 | 100.0 | 100.0 |
| "Resin B" | 1.0 | 5.0 | 10.0 |
| Sodium bicarbonate (powdered) | .7 | .7 | .7 |
| Diatomaceous earth (finely divided) | 2.0 | 2.0 | 2.0 |

Intimately mix the above ingredients in the proper size container for a period of from 10 to 30 minutes, employing a high speed stirrer. When mixing has been completed the resin will have a fine creamy appearance.

*Preparation of cellular product*

|  | Parts |
|---|---|
| Phenolsulfonic acid (30% by weight in $H_2O$) | 7.0 |
| Surface active material (specifically "Tween 20" which is comprised of polyethylene ethers of sorbitan mono-ester of a fatty acid containing from 12 to 18 carbon atoms inclusive) | .2 |

The ingredients above are added to the fine creamy precellular liquid. This mixture is rapidly stirred for about 15 to 30 seconds and then is rapidly transferred to the container which it is desired to fill with foam. Within a short period of time, about 1 to 5 minutes after the ingredients have been mixed, the mixture begins to foam. The above composition is self-heat generating, self-rising and self-curing.

The ingredients used in formulating the cellular product of this invention are the same as set forth in Patent 2,446,429 with the exception of "resin B" of this invention which is absent from Patent 2,446,429. Likewise the equivalents for the various ingredients set forth in Patent 2,446,429 are suitable equivalents for the corresponding ingredients in the present invention.

The following tables show a comparison of physical properties of the cellular phenolic resin of Patent 2,446,429 and the modified resin of the present invention. Table No. 1 shows the effect of water immersion on foam buoyancy and Table No. 2 shows the compressive strength test of foam.

TABLE NO. 1.—EFFECT OF WATER IMMERSION ON FOAM BUOYANCY

| Test No. | 1 | 2 | 3 | 4 | 5 | 6 | 7 | 8 | 9 | 10 | 11 |
|---|---|---|---|---|---|---|---|---|---|---|---|
| Type of Foam | Resin A | Resin A +0.75% Resin B | Resin A +1.5% Resin B | Resin A +3% Resin B | Resin A +5% Resin B | Resin A | Resin A +5% Resin B | Resin A +5% Resin B | Resin A +5% Resin B | Resin A Prefab. sample | Resin A (old resin) + 10% Resin B |
| Stirring Time | 25 min. | 25 min. | 25 min. | 25 min. | 25 min. | 5 min. stir | 5 min. | 5 min. stir | 5 min. stir |  |  |
| Density core material, pound-cubic foot core material | 1.4 | 1.7 | 1.8 | 5.3 | 6.8 | 2.6 | 7.6 | 18.9 | 12.5 | 8.2 | 10.2 |
| Residual buoyancy, fresh water | 61.2 | 60.5 | 60.5 | 56.8 | 56.2 | [1] 61.7 | 54.5 | 43.0 | 49.4 | [1] 55.5 | [1] 54.1 |
| Buoyancy after 24 hr. immersion in fresh water, 30 ft. head | 42.6 | 53.3 | 49.8 | 48.4 | 50.3 | [1] 27.6 | 42.1 | 38.3 | 39.4 | [1] 19.5 | [1] 38.9 |
| Loss in buoyancy, pounds/cubic foot, 24 hr. immersion | 18.6 | 7.2 | 10.7 | 8.4 | 5.9 | 34.1 | 12.4 | 4.5 | 10.0 | 36.0 | 15.2 |

[1] Salt water immersion.

TABLE NO. 2—COMPRESSIVE STRENGTH TEST OF FOAM

| Test No. | 1 | 2 | 3 | 4 | 5 | 7 | 8 | 9 | 10 | 11 |
|---|---|---|---|---|---|---|---|---|---|---|
| Type of Foam | Resin A | Resin A +0.75% Resin B | Resin A +1.5% Resin B | Resin A +3% Resin B | Resin A +5% Resin B | Resin A +5% Resin B | Resin A +5% Resin B | Resin A +5% Resin B | Resin A Prefab. sample | Resin A +10% Resin B |
| Stirring Time | 25 min. | 25 min. | 25 min. | 25 min. | 25 min. | 5 min. | 5 min. | 5 min. |  | 5 min. |
| Density core material, pound cubic foot | 1.4 | 1.7 | 1.8 | 5.3 | 6.8 | 7.6 | 18.9 | 12.5 | 8.2 | 10.2 |
| Compressive strength, pound/square inch | 1.8 | 5.9 | 6.9 | 23.6 | 19.8 | 142 | 59 | 23.3 | 52 | 353 |

The results shown by Tables #1 and #2 indicate that the addition of "resin B" ingredient decreases the water absorbency of the unmodified foam and thereby decreases the loss in buoyancy caused by water immersion. It is apparent also that the addition of "resin B" in amounts above 1.5% materially increases the compressive strength of the foam. It would appear that the addition of "resin B" results in a larger proportion of closed cell structure and thereby reduces the water absorption of the foam. It would appear that quantities above 1½ percent of the added ingredient, "resin B," retards the polymerization reaction rate of the resin and permits the foam to set up before foaming is complete thereby increasing its density and decreasing its compressibility. It also has been shown that by increasing the stirring time of the mixed resins from 5 to 25 minutes, a product of lower density can be obtained using the same foam mixture.

Obviously many modifications and variations of the present invention are possible in the light of the above teachings. It is therefore to be understood that within the scope of the appended claims the invention may be practiced otherwise than as specifically described.

We claim:

1. The method of preparing a cellular phenol-formaldehyde resin which comprises allowing to expand and to react to completion in expanded state a foam-forming, heat-generating, acidified, flowable composition including (1) an aqueous mass of acid-curing, thermosetting, alkaline-catalyzed, liquid product of partial reaction of a phenol and formaldehyde, said aqueous mass containing about 78 to about 85 percent by weight of phenol-formaldehyde resin solids and having been treated to render it non-alkaline, (2) a resin having about 10 parts by weight meta tolylene diisocyanate, and about 5 parts by weight of pentaerythritol mono-oleate, and about 3 parts by weight of pentaerythritol dipropional, said resin being present in an amount corresponding to from about .5 to 10.0 percent by weight of said aqueous mass, (3) sodium bicarbonate in an amount corresponding to from 0.3 to 1.5 percent by weight of said aqueous mass of (1), and (4) an aqueous solution comprising phenol-sulfonic acid, the amount thereof being slightly in excess of the molecular equivalent required for complete reaction with the sodium bicarbonate of (3).

2. A product comprising a cellular phenolic resin obtained by the expansion of a foam-forming, heat-generating, flowable composition including (1) an aqueous mass of acid-curing, thermosetting, barium hydroxide-catalyzed, liquid product of partial reaction of ingredients comprising phenol and formaldehyde, said aqueous mass containing about 75 to about 85 percent of phenol-formaldehyde resin solids and having been treated to render it non-alkaline, (2) a resin having about 10 parts by weight meta tolylene diisocyanate, and about 5 parts by weight of pentaerythritol mono-oleate, and about 3 parts by weight of pentaerythritol dipropional, said resin being present in an amount corresponding to from about .5 to 10.0 percent by weight of said aqueous mass, (3) a water-soluble salt of carbonic acid in an amount corresponding to from 0.3 to 1.5 percent by weight of said aqueous mass of (1), and (4) an aqueous solution comprising a water-soluble sulfonic acid, the amount thereof being slightly in excess of the molecular equivalent required for complete reaction with the water-soluble salt of (3).

3. A composition of matter comprising (1) an aqueous mass of acid-curing, thermosetting, liquid product of partial reaction of ingredients comprising a phenol and an aldehyde, said aqueous mass containing at least about 75 percent, by weight, of the aforesaid phenol-aldehyde reaction product as solids, and (2) a resin having about 10 parts by weight meta tolylene diisocyanate and about 5 parts by weight of pentaerythritol mono-oleate and about 3 parts by weight of pentaerythritol dipropional, said resin being present in an amount corresponding to from about .5 to 10.0 percent, by weight, of said aqueous mass.

References Cited in the file of this patent

UNITED STATES PATENTS

| | | |
|---|---|---|
| 2,446,429 | Nelson et al. | Aug. 3, 1948 |
| 2,577,281 | Simon et al. | Dec. 4, 1951 |